(12) United States Patent
Roche

(10) Patent No.: US 6,196,200 B1
(45) Date of Patent: Mar. 6, 2001

(54) COMPACT FUEL PUMP MODULE AND FINAL FILTER

(75) Inventor: Ronald H. Roche, Cass City, MI (US)

(73) Assignee: Walbro Corporation, Cass City, MI (US)

(*) Notice: Subject to any disclaimer, the term of this patent is extended or adjusted under 35 U.S.C. 154(b) by 0 days.

(21) Appl. No.: 09/228,616

(22) Filed: Jan. 12, 1999

(51) Int. Cl.$^7$ ............................................. F02M 37/04
(52) U.S. Cl. ........................................ 123/509; 123/510
(58) Field of Search ............................ 123/510, 509, 123/516, 514, 497

(56) References Cited

U.S. PATENT DOCUMENTS

| | | | | |
|---|---|---|---|---|
| 5,392,750 | * | 2/1995 | Laue | 123/509 |
| 5,564,396 | * | 10/1996 | Kleppner | 123/509 |
| 5,593,287 | * | 1/1997 | Sadakata | 123/509 |
| 5,647,330 | * | 7/1997 | Sawert | 123/509 |
| 5,649,514 | * | 7/1997 | Okada | 123/509 |
| 5,699,773 | * | 12/1997 | Kleppner | 123/509 |
| 5,740,784 | | 4/1998 | McKinney | 123/509 |
| 5,758,627 | * | 6/1998 | Minagawa | 123/509 |
| 5,769,061 | * | 6/1998 | Nagata | 123/509 |
| 5,782,223 | | 7/1998 | Yamashita et al. | 123/510 |
| 5,785,032 | | 7/1998 | Yamashita et al. | 123/509 |
| 5,860,796 | | 1/1999 | Clausen | 417/423.9 |
| 5,900,140 | | 5/1999 | Nagai et al. | 210/85 |
| 5,900,148 | | 5/1999 | Izutani et al. | 210/493.1 |

* cited by examiner

Primary Examiner—Carl S. Miller
(74) Attorney, Agent, or Firm—Reising, Ethington, Barnes, Kisselle, Learman & McCulloch, P.C.

(57) ABSTRACT

A fuel pump module with a housing which carries a fuel pump and a fuel filter between an outlet of the fuel pump and an outlet of the module housing to filter fuel discharged from the fuel pump before it is delivered under pressure to an operating engine. The fuel filter preferably provides the final filtering of the fuel before it is delivered to the engine and preferably has a large surface area to extend the life of the fuel filter in use. The fuel filter is preferably generally cylindrical and has a casing defining an interior opening in which the fuel pump is received with a seal to prevent fuel leakage between them. Preferably, the components of the fuel pump module are generally telescopically and coaxially fitted together to provide a compact fuel pump module while still providing a large surface area fuel filter.

20 Claims, 2 Drawing Sheets

COMPACT FUEL PUMP MODULE AND FINAL FILTER

FIELD OF THE INVENTION

This invention relates generally to fuel systems and more particularly to an improved fuel pump module.

BACKGROUND OF THE INVENTION

Electric motor fuel pumps have been used to deliver fuel at a high pressure to internal combustion engines, such as in automotive, marine and other applications. In some applications, these fuel pumps are disposed within a fuel pump module itself constructed to be disposed in a vehicle fuel tank. Typically, a fuel filter communicates with the fuel pump inlet to filter fuel drawn into the fuel pump. Also typically, a second fuel filter, usually of an in-line configuration, is located downstream of the fuel pump and upstream of the fuel rail. Fuel discharged from the fuel pump under a high pressure is delivered to the engine fuel dispensing device, such as fuel injectors, through a fuel line and typically, a fuel rail connected to the injectors.

One such fuel pump module is disclosed in U.S. Pat. No. 5,740,784. As disclosed, this fuel pump module has a filter in the bottom area of a canister to filter fuel arriving in the canister from a fuel tank before it is drawn into the fuel pump. Fuel discharged from the fuel pump is not further filtered.

SUMMARY OF THE INVENTION

A fuel pump module has a housing which carries a fuel pump and a fuel filter between an outlet of the fuel pump and an outlet of the module housing to filter fuel discharged from the fuel pump before it is delivered under pressure to an operating engine. The fuel filter preferably provides the final filtering of the fuel before it is delivered to the engine and preferably has a large surface area to extend the life of the fuel filter in use. The fuel filter is preferably generally annular and has a casing defining an interior opening in which the fuel pump is received with a seal to prevent fuel leakage between them. Preferably, all of the components of the fuel pump module are generally telescopically or coaxially fitted together to provide a compact fuel pump module while still providing a large surface area fuel filter.

Desirably, each of the components of the fuel pump module may be rapidly assembled by press fitting the various components together to facilitate assembly of the fuel pump module. Further, the size of the various components of the fuel pump module may be varied to accommodate fuel pumps of different sizes.

Objects, features and advantages of this invention include providing a fuel pump module which filters fuel discharged from the fuel pump outlet, provides a fuel filter with a large surface area to extend the life of the fuel filter and prevent undesirable resistance to fuel flow in use, can be readily adapted to accommodate fuel pumps of different sizes, is compact, durable, reliable, of relatively simple design, economical manufacture and assembly and has a long useful life in service.

BRIEF DESCRIPTION OF THE DRAWINGS

These and other objects, features and advantages of this invention will be apparent from the following detailed description of the preferred embodiment and best mode, appended claims and accompanying drawings in which:

FIG. 3 is a cross sectional view of the fuel pump module taken generally along line 3—3 of FIG. 1.

DETAILED DESCRIPTION OF THE PREFERRED EMBODIMENT

Figure 1:
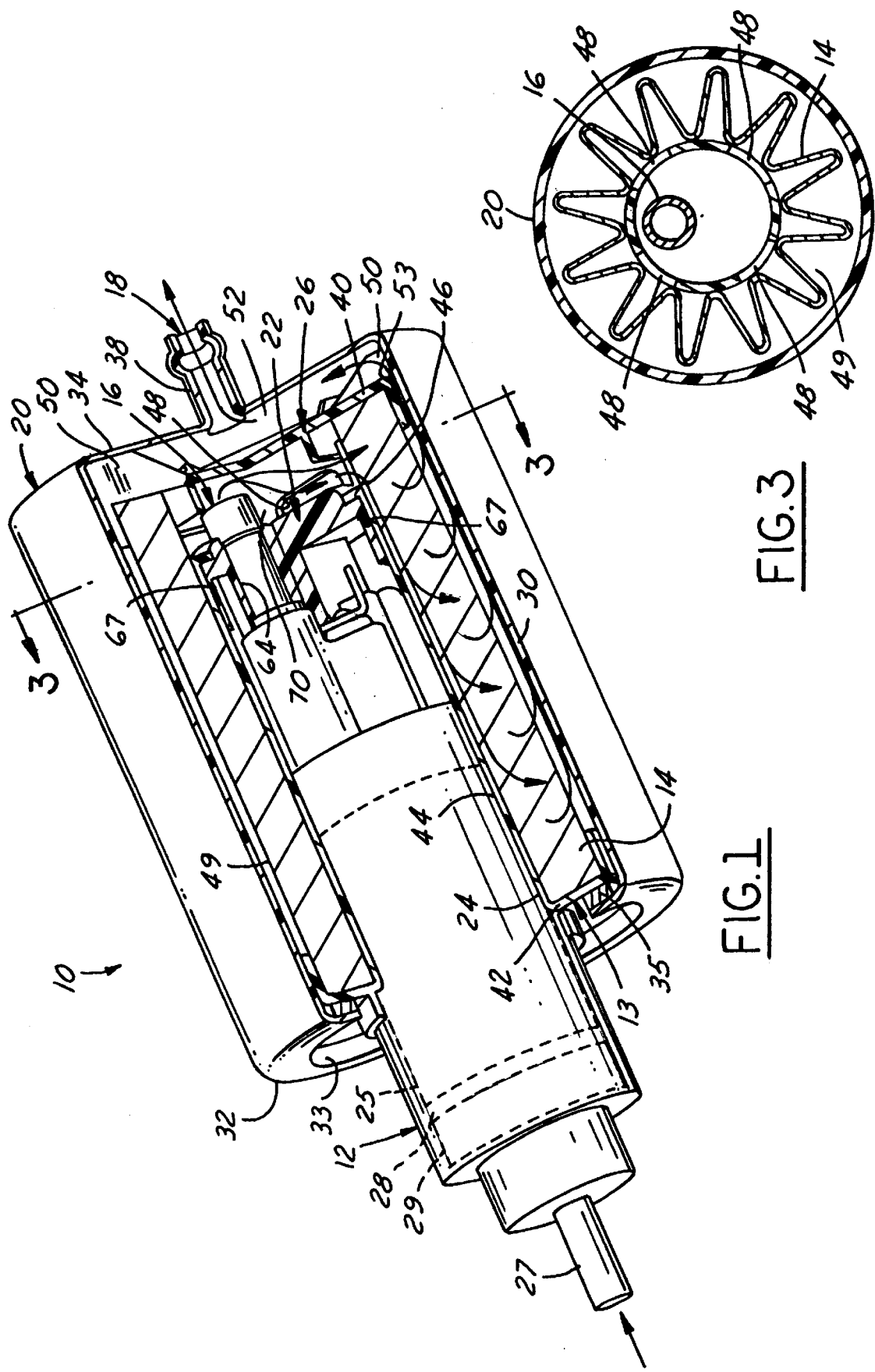
FIG. 1 is a perspective view with parts in section of a fuel pump module embodying the invention.
Figure 2:
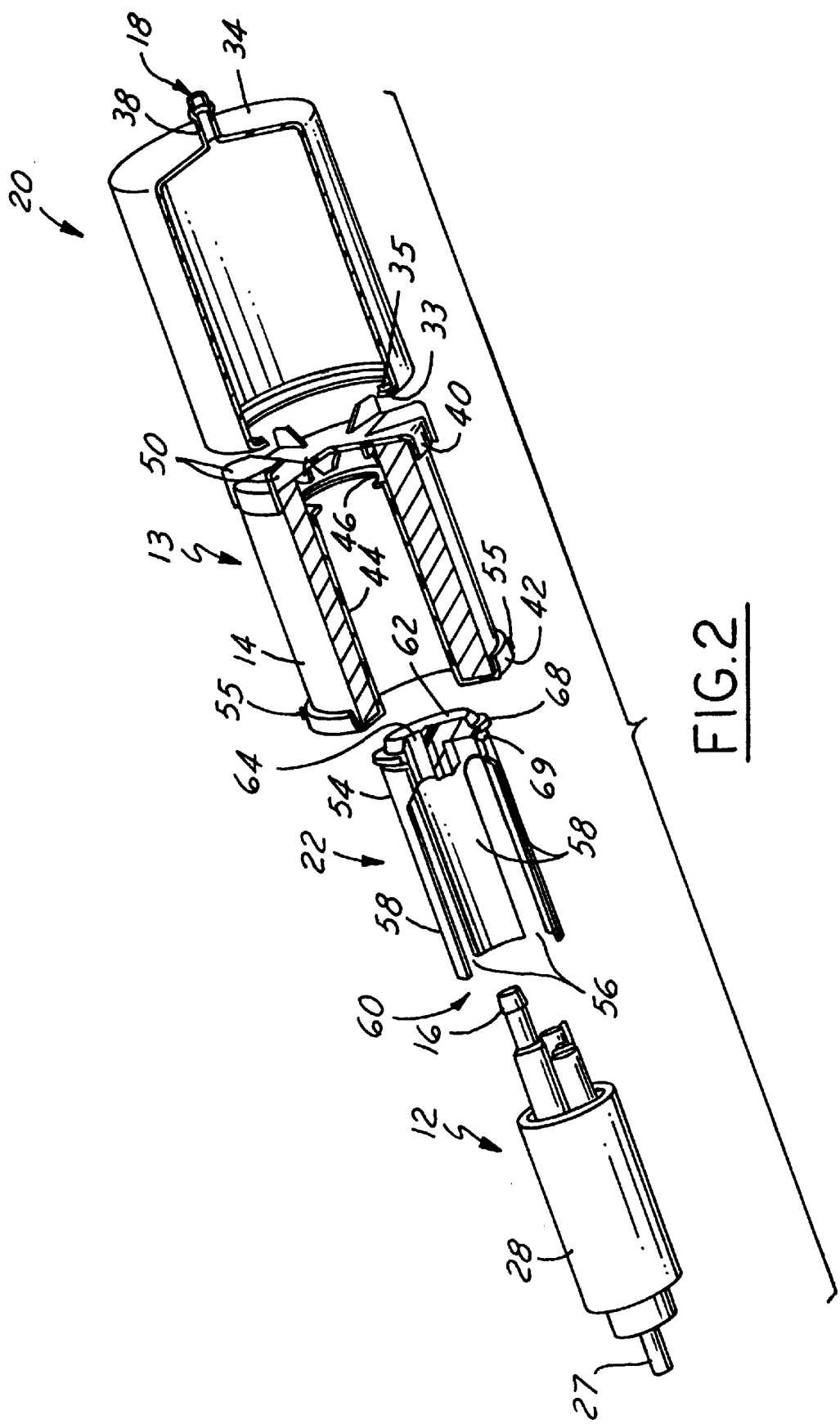
FIG. 2 is an exploded view with some parts in section of the fuel pump module of FIG. 1.

Referring in more detail to the drawings, FIG. 1 illustrates a fuel pump module 10 embodying the present invention which has a fuel pump 12 and a fuel filter assembly 13 with a fuel filter 14 downstream of an outlet 16 of the fuel pump 12 and upstream of an outlet 18 of a housing 20 of the fuel pump module 10. As shown in FIG. 2, the fuel pump 12 is preferably telescopically disposed at least partially within an adapter shell 22 which is telescopically received within an opening 24 of a generally cylindrical casing 26 which carries the fuel filter 14. The fuel filter casing 26 is in turn telescopically received within the housing 20 to complete the fuel pump module 10 assembly.

The fuel pump 12 preferably has an electric motor 25 which drives a pumping assembly 29 to draw fuel into an inlet 27 of the fuel pump and deliver fuel under pressure from an outlet 16 of the fuel pump 12. An outer shell 28 of the fuel pump 12 is preferably generally cylindrical and to accommodate fuel pumps having different outside diameters, different fuel filter assemblies 13 or fuel pump adapter shells 22 may be used.

The fuel pump module housing 20 is preferably generally cylindrical with a relatively thin sidewall 30, an open first end 32 and a substantially closed second end 34. The first end 32 of the housing 20 preferably has in assembly a generally radially inwardly extending rim 33 and a sealing ring 35 is received between the fuel filter assembly 13 and the rim 33 in assembly to provide a seal between them. The rim 33 is formed after assembly of the other components into the housing 20 to retain the components in the housing 20 and to engage the sealing ring 35 to provide a permanently sealed assembly. The outlet 18 of the housing is formed through the second end 34 of the housing 20 and communicates the interior of the housing 20 with the exterior of the housing 20. The outlet 18 is preferably formed in a stem 38 extending axially outwardly from the second end 34 of the housing 20 to receive a fuel line press fit on the stem 38.

The fuel filter assembly 13 is constructed to be telescoped into the housing 20 and comprises the filter 14 and the casing 26. The casing has upper and lower end caps 40 and 42 received over opposed ends of the filter 14 to retain the filter 14 within the casing 26. The casing 26 also has a generally cylindrical interior wall 44 which defines the opening 24 in which the fuel pump 12 is received. The interior wall 44 has a circumferentially continuous and radially inwardly extending rim 46 providing a shoulder engageable by the fuel pump adapter shell 22. Openings 48 through the interior wall 44 communicate fuel discharged from the fuel pump outlet 16 with the fuel filter 14 which is received in an annular chamber 49 defined between the inner wall 44 and the sidewall 30 of the housing 20. A plurality of tabs 50 extending axially from the upper end cap 40 of the casing 26 limit the insertion of the fuel filter assembly 13 into the housing 20 and provide a fuel chamber 52 between the upper end cap 40 and the second end 34 of the housing 20 through which fuel may flow into the outlet 18 of the housing. The tabs preferably also extend generally radially outwardly from the upper end cap 40 to define gaps 53 between the sidewall 30 of the housing 20 and the upper end cap 40 through which fuel downstream of the filter may flow around the upper end cap 40 and into the fuel chamber 52. Tabs 50 and radially projecting tabs 55 on the lower end cap 40 preferably have an interference fit with the housing sidewall 30 to retain the filter assembly 13 in the housing 20.

The fuel filter 14 is preferably generally cylindrical with an elongate and pleated sidewall providing an increased surface area to extend the life of the fuel filter 14 and reduce resistance to fuel flow through the filter due to a dirty or clogged fuel filter. The fuel filter 14 is sized so that it does not need to be replaced during the expected service life of the fuel pump. As shown in FIG. 3, the fuel filter material is preferably generally accordion or fan-folded to increase its effective surface area. The fuel filter may be formed of any suitable material such as paper or a mesh or open-cell foam and preferably has an average effective pore size of about 1 to 10 microns.

The fuel pump adapter shell 22 preferably has a sidewall 54 with a plurality of slots 56 formed therein and defining a plurality of resilient fingers 58 which may be flexed to provide a tight fit between the adapter shell 22 and the interior wall 44 of the fuel filter assembly 13 into which the adapter shell 22 is inserted. The adapter shell 22 is open at one end 60 to receive the fuel pump 12 and closed at the other end 62 except for a through bore 64 into which the fuel pump outlet 16 is inserted. Desirably, an interference fit between the fuel pump outlet 16 and the shell 22 within the through bore 64 provides a liquid tight seal to prevent fuel leakage between the fuel pump outlet 16 and the shell 22. To provide a fluid tight seal between the shell 22 and the fuel filter assembly casing 26, the shell 22 has a circumferentially continuous and generally radially outwardly extending flange 68 constructed to overlap and bear on the inwardly extending rim 46 of the interior wall 44 of the casing 26 in assembly. Additionally, an O-ring 67 is preferably received in a groove 69 formed in the shell 22 below the flange 68. Engagement of the flange 68 with the rim 46 also locates the shell 22 and hence, the fuel pump 12 relative to the filter assembly 13. Adapter shells 22 of different size or construction may be used to accommodate different fuel pumps.

In assembly of the fuel pump module 10, as shown in FIG. 1, the fuel pump outlet 16 extends into a chamber 70 defined between the upper end cap 40 and the seal defined between the flange 68 of the shell 22 and the rim 46 of the casing 26. Fuel discharged from the fuel pump outlet 16 enters this chamber 70, flows through the openings 48 in the casing 26 and into and through the fuel filter 14 received in the annular chamber 49. After passing through the filter 14, fuel flows through the gaps 53 and into the fuel chamber 52 to be discharged under pressure through the outlet 18 of the housing 20. Notably, the fuel must pass through the filter 14 before it can enter the fuel chamber 52 through the gaps 53.

Thus, the fuel pump module 10 according to the present invention is comprised of relatively few parts which may be readily assembled to provide a flow of filtered fuel from a fuel pump 12 to an engine. Additionally, the large surface area of the filter 14 reduces the likelihood that the filter 14 will become excessively clogged in use to thereby extend the life of the fuel filter in use and prevent undesirable resistance to fuel flow to the engine. Further, the components of the module 10 are generally coaxially telescopically fitted together to provide an assembled module which is extremely compact.

What is claimed is:

1. A fuel pump module, comprising:
   a housing having a fuel outlet;
   a fuel filter carried by the housing upstream of the fuel outlet;
   a fuel filter casing in which the fuel filter is received, said fuel filter casing being carried by the housing with a liquid-tight seal between one end of the housing and the fuel filter casing; and
   a fuel pump carried by the housing and having an inlet into which fuel is drawn and an outlet upstream of the fuel filter, in communication through the filter with the fuel outlet of the housing, and through which fuel is discharged under pressure to flow through the fuel filter before passing through the fuel outlet of the housing for delivery to an engine.

2. The module of claim 1 wherein the housing and the fuel filter casing are generally cylindrical and the fuel filter casing is generally coaxial with and telescopically received in the housing.

3. The module of claim 2 wherein the fuel filter casing has an interior wall defining an opening in which the fuel pump is at least partially received.

4. The module of claim 2 wherein the fuel filter is generally cylindrical and annular with an elongate sidewall.

5. The module of claim 1 wherein an annular fuel chamber is defined between the fuel filter casing and the housing and the fuel filter is disposed in this fuel chamber.

6. A fuel pump module, comprising:
   a housing having a fuel outlet;
   a fuel filter assembly carried by the housing and having a fuel filter upstream of the fuel outlet of the housing and a casing which carries the fuel filter, having an open end and defining a fuel chamber with the housing in communication with the fuel outlet of the housing;
   a fuel pump at least partially received in the open end of the casing and having an inlet into which fuel is drawn and an outlet disposed upstream of the fuel filter and in communication through the filter with the fuel chamber whereby fuel discharged from the fuel pump outlet flows through the fuel filter into the fuel chamber and out of the housing through the housing fuel outlet.

7. The module of claim 6 wherein each of the housing, fuel filter assembly and fuel pump are generally cylindrical and are generally coaxially fitted together.

8. The module of claim 6 wherein the fuel pump is press-fit into the open end of the casing.

9. The module of claim 6 which also comprises a fuel pump adapter shell constructed to be press-fit into the open end of the casing with the fuel pump at least partially received in the fuel pump adapter shell.

10. The module of claim 6 wherein the fuel filter is generally cylindrical and annular and surrounds at least a portion of the fuel pump in assembly.

11. The module of claim 6 wherein the casing has an upper end cap and at least one tab extending from the upper end cap and constructed to engage the housing to define a fuel flow path between the casing and housing and communicating with the housing fuel outlet.

12. The module of claim 11 wherein a plurality of tabs extend from the upper end cap.

13. The module of claim 6 wherein the casing has a lower end cap and at least one tab extending generally radially from the lower end cap and constructed to engage the housing.

14. The module of claim 13 wherein a plurality of tabs extend from the lower end cap to retain the casing in the housing in assembly of the fuel pump module.

15. The module of claim 6 wherein the housing is open at one end and, in assembly, has a radially inwardly extending rim to retain the fuel filter assembly within the housing.

16. The module of claim 15 wherein a seal is provided between the rim of the housing and the casing.

17. The module of claim 9 wherein a seal is disposed between the fuel pump adapter shell and the casing.

18. The module of claim 9 wherein the fuel pump adapter shell and casing define a fuel chamber which communicates the fuel pump outlet with the fuel filter.

19. The module of claim 6 wherein the casing and housing define an annular chamber between them and the fuel filter is received in the annular chamber.

20. The module of claim 4 wherein the fuel filter surrounds at least a portion of the fuel pump.

* * * * *